United States Patent
Shlivinski et al.

(10) Patent No.: US 8,244,198 B1
(45) Date of Patent: Aug. 14, 2012

(54) WIRELESS DEVICE LOCAL OSCILLATOR GENERATION APPARATUS AND METHODS

(75) Inventors: Yariv Shlivinski, Ramat-Hasharon (IL); Eran Nussbaum, Herzliya (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/043,445

(22) Filed: Mar. 8, 2011

(51) Int. Cl.
*H04B 1/26* (2006.01)

(52) U.S. Cl. ............... 455/315; 455/86; 455/87; 455/77; 455/323; 455/333

(58) Field of Classification Search .................. 455/315, 455/86, 87, 77, 323, 333
See application file for complete search history.

(56) References Cited

U.S. PATENT DOCUMENTS

| | | | |
|---|---|---|---|
| 7,894,790 B2 | 2/2011 | Gomez | |
| 8,019,290 B2 * | 9/2011 | Mak et al. | 455/91 |
| 8,121,558 B2 * | 2/2012 | Rajendran et al. | 455/87 |
| 2004/0229592 A1 * | 11/2004 | Matsui et al. | 455/333 |
| 2011/0306311 A1 * | 12/2011 | Chang et al. | 455/86 |

* cited by examiner

*Primary Examiner* — Sanh Phu
(74) *Attorney, Agent, or Firm* — Steven A. Shaw; W. James Brady; Frederick J. Telecky, Jr.

(57) ABSTRACT

Apparatus and methods disclosed herein operate to determine a base oscillator frequency and a frequency conversion factor associated with a radio receiver local oscillator (LO). Base oscillator frequency and frequency conversion parameters are selected such that spurious harmonics created within the LO lie outside of communication bands associated with other active radio receivers substantially collocated with the LO. An LO chain including the appropriate base oscillator and frequency conversion components is selected from a switched set of base oscillator/frequency converter pairs.

20 Claims, 5 Drawing Sheets

WIRELESS DEVICE LOCAL OSCILLATOR GENERATION APPARATUS AND METHODS

TECHNICAL FIELD

Embodiments described herein relate to apparatus and methods associated with wireless communication technology, including structures and methods associated with local oscillator frequency conversion.

BACKGROUND INFORMATION

Personal mobile communication (PMC) devices such as smart phones are becoming increasingly ubiquitous. Such devices may be capable of accessing voice and/or data services operating within various communication bands. For example, it is not unusual for a modern PMC device to include two-way voice communication across a mobile carrier radio link; two-way Internet access via the mobile carrier radio link; 802.11 data communication with an 802.11 access point, with an 802.11-enabled computer, and/or with another 802.11-enabled PMC device; a Bluetooth® radio link, a global positioning system (GPS) receiver, etc. Multiple radio frequency (RF) receivers associated with these diverse communication services may be required to operate simultaneously and in close proximity on small circuit boards within a PMC device.

Additional information regarding the IEEE 802.11 standard may be found in ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications (published 1999; reaffirmed June 2003). Additional information regarding Bluetooth® may be found in 802.15.3c-2009 IEEE Standard for Information technology—Telecommunications and information exchange between systems—Local and metropolitan area networks—Specific requirements. Part 15.3: Wireless Medium Access Control (MAC) and Physical Layer (PHY) Specifications for High Rate Wireless Personal Area Networks (WPANs) Amendment 2: Millimeter-wave-based Alternative Physical Layer Extension.

This situation poses challenges for receiver design in various ways. For example, transmitted signals create strong RF fields which must be filtered by the receivers. In addition, local oscillators (LOs) associated with the receivers themselves can create spurious harmonics ("spurs") of substantial magnitude. Spurs may be generated as unwanted byproducts of mixing and other frequency conversion operations used to convert a base oscillator signal to the required LO frequency.

RF energy from spurs may overlap frequencies within radio bands associated with other co-located receivers, as described above. To alleviate this type of interference, costs may be incurred and circuit board space sacrificed as filters and/or shielding are added at the offending LO and/or at receiver front-ends impacted by such spurs.

SUMMARY OF THE INVENTION

Embodiments herein operate to monitor the operational state of radio receivers in a multi-receiver apparatus such as a PMC device and to customize receiver LO chain frequency conversion accordingly. Frequency conversion elements are selected such as to place spurious harmonics created by the LO chain outside of radio bands being utilized by other active, substantially collocated radio receivers. Filtering/shielding device costs and circuit board space may be conserved as a result.

DETAILED DESCRIPTION

Figure 1:
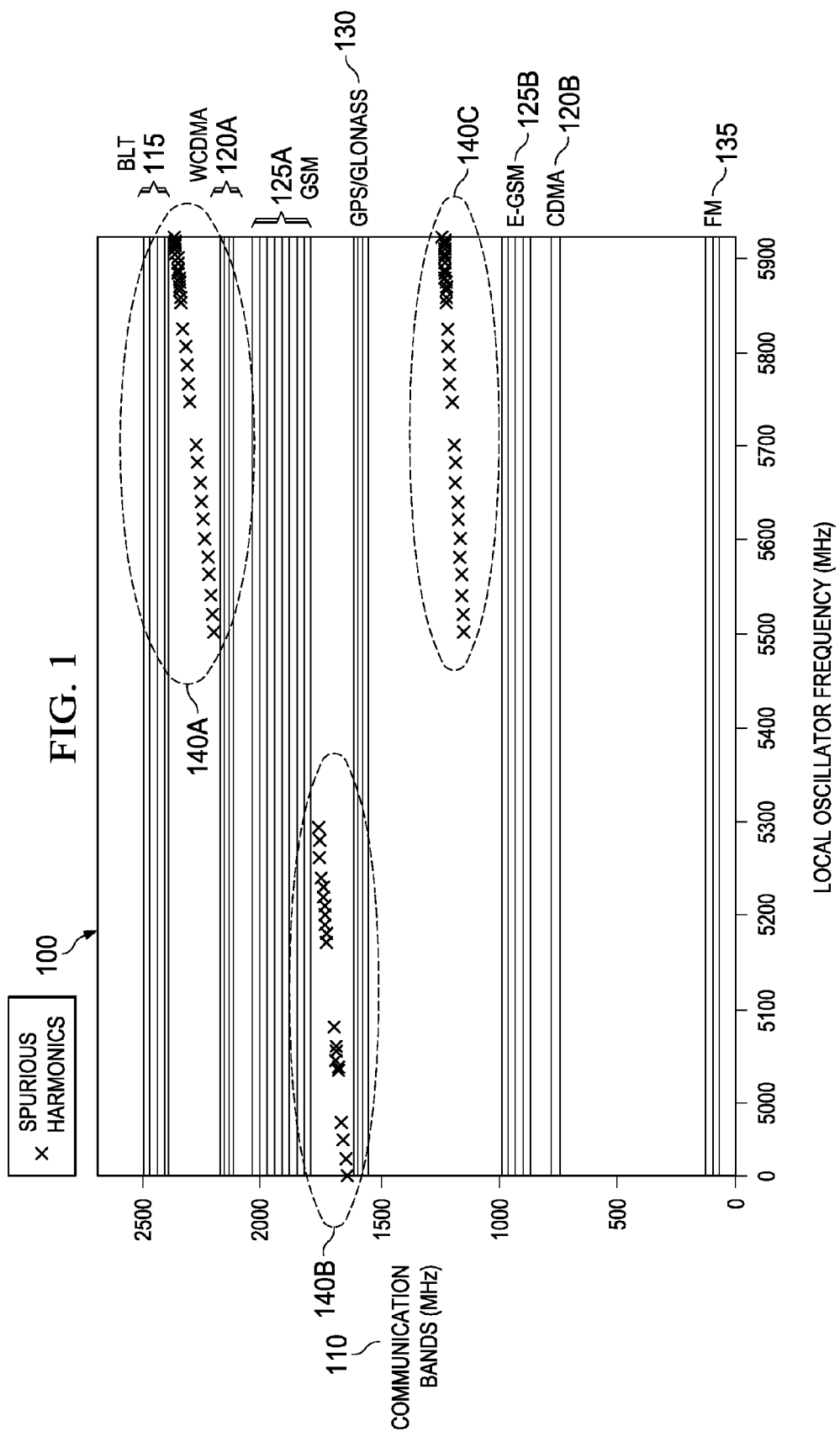
FIG. 1 is an example frequency spectrum chart showing spurious harmonics positioned with respect to wireless communication bands according to various embodiments of the invention.

FIG. 1 is an example frequency spectrum chart 100 showing spurs positioned with respect to wireless communication bands according to various embodiments of the invention. The chart 100 illustrates communication bands 110 associated with co-located transceivers in an example PMC device. The communication bands 110 may include frequency ranges 115 associated with Bluetooth® transceivers, frequency ranges 120A and 120B associated with CDMA transceivers, frequency ranges 125A and 125B associated with GSM transceivers, frequency ranges 130 associated with GPS & GLONASS receivers, and frequency ranges 135 associated with FM receivers, for example and without limitation.

The illustrative communication bands 110 shown on the spectrum chart 100 may be associated with an example set of radio communication services found on a PMC device. It is noted that some PMC devices may include subsets of these services and/or may include additional services other than those for which frequency bands are shown. Is also noted that FIG. 1 is intended to illustrate frequency spectra associated with these and other services generally rather than precisely and that such spectra and associated wireless services may vary by political jurisdiction.

The example spectrum chart 100 also illustrates spur groups 140A, 140B, and 140C. Spurs such as those in these example groups may be generated by frequency conversion and mixing mechanisms associated with LO structures within a PMC device. Such mechanisms may include frequency mixers, frequency multipliers, frequency dividers, and intermediate oscillators, among others, as further detailed below. Embodiments disclosed herein operate to place spurs (e.g., the spurs in groups 140A, 140B, and 140C) outside of communication bands (e.g., the communication bands 110) associated with wireless services integrated into a PMC device.

Figure 2:
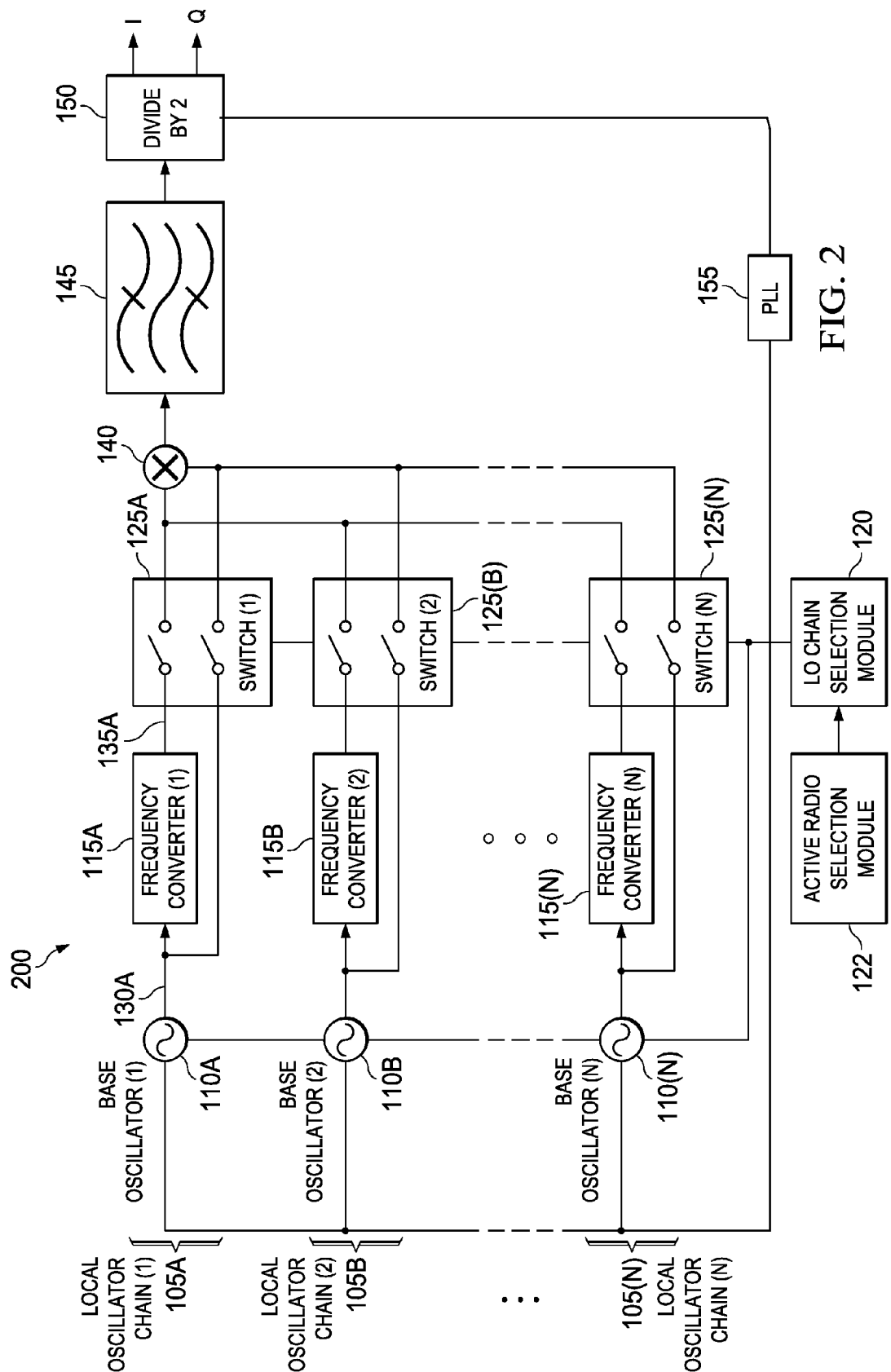
FIG. 2 is a block diagram of a local oscillator apparatus according to various example embodiments.

FIG. 2 is a block diagram of an LO apparatus 200 according to various example embodiments. The LO apparatus 200 includes multiple switched LO chains (e.g., the LO chains 105A, 105B . . . 105(N)). Embodiments herein select an LO chain configuration based upon the set of radio receivers currently active. An LO chain is selected such that spurs produced by the selected configuration lie outside of communication bands associated with currently active radio receivers. It is noted that the LO signal itself is not considered to be a "spur" in this context, although it is associated with the active receiver to which it is directed.

The LO apparatus 200 also includes multiple switched base oscillators 110A, 110B . . . 110(N). For each LO chain configuration, a base oscillator is selected from the set of base oscillators 110A, 110B . . . 110(N) to generate a base oscillator signal.

The LO apparatus 200 also includes multiple frequency converters 115A, 115B . . . 115(N). Each frequency converter is communicatively coupled to a corresponding base oscillator (e.g., the frequency converter 115A is coupled to the base oscillator 110A). A frequency converter receives a base oscillator signal from a corresponding base oscillator and converts the base oscillator signal to an intermediate frequency (IF) signal. For purposes of this disclosure, the term "IF signal" shall mean a signal derived from a base oscillator signal that is used to produce an LO signal. It is noted that some embodiments may include two or more frequency converters in a single LO chain, including cascaded arrangements of frequency converters.

The LO chain apparatus 200 further includes an LO chain selection module 120 communicatively coupled to the base oscillators 110A, 110B . . . 110(N). The LO chain selection module 120 chooses an appropriate base oscillator from the set of base oscillators 110A, 110B . . . 110(N). The base oscillator is chosen such that spurs created by frequency conversion of the base oscillator signal within the LO chain apparatus 200 lie outside of communication bands (e.g., the communication bands 110 of FIG. 1) associated with active radio receivers substantially collocated with the LO chain apparatus 200.

An active radio selection module 122 may be communicatively coupled to the LO chain selection module 120. The active radio selection module 122 indicates to the LO chain selection module 120 which radio receivers substantially collocated with the LO chain apparatus 200 are active.

In some embodiments, the selectable LO chain apparatus 200 also includes multiple switch banks 125A, 125B . . . 125(N). Each switch bank is communicatively coupled to a corresponding frequency converter (e.g., the switch bank 125A is coupled to the frequency converter 115A). The LO chain selection module 120 controls the switch banks 125A, 125B . . . 125(N). A switch bank chosen by the LO chain selection module 120 selects an active base oscillator output (e.g., the output 130A), a corresponding frequency converter output (e.g., the output 135A), or both. Signals associated with these outputs are passed forward in the selected LO chain and form components of the LO signal.

The selectable LO chain apparatus 200 also includes an RF mixer 140. The RF mixer 140 is communicatively coupled to one or more of the switch banks 125A, 125B . . . 125(N) and derives an LO signal by mixing a selected base oscillator signal (e.g., the base oscillator signal at the output 130A) and a selected IF signal (e.g., the IF signal at the output 135A).

The LO chain apparatus 200 may further include a bandpass filter 145. The bandpass filter 145 is communicatively coupled to the mixer 140 to filter harmonics from the LO signal.

Some embodiments of the LO chain apparatus 200 may be configured for quadrature operation. In that case the LO chain apparatus 200 may include a divide by two module 150. The divide by two module 150 is communicatively coupled to the bandpass filter 145 to split the LO signal into I and Q components.

Some embodiments may also include a phase-locked loop (PLL) 155 coupled to an LO signal output (e.g., the divide by two module 150) and to the base oscillators 110A, 110B, and 110(N). The PLL 155 may be employed to phase-lock the base oscillators 110A, 110B, and 110(N) to a master clock.

Figure 3:
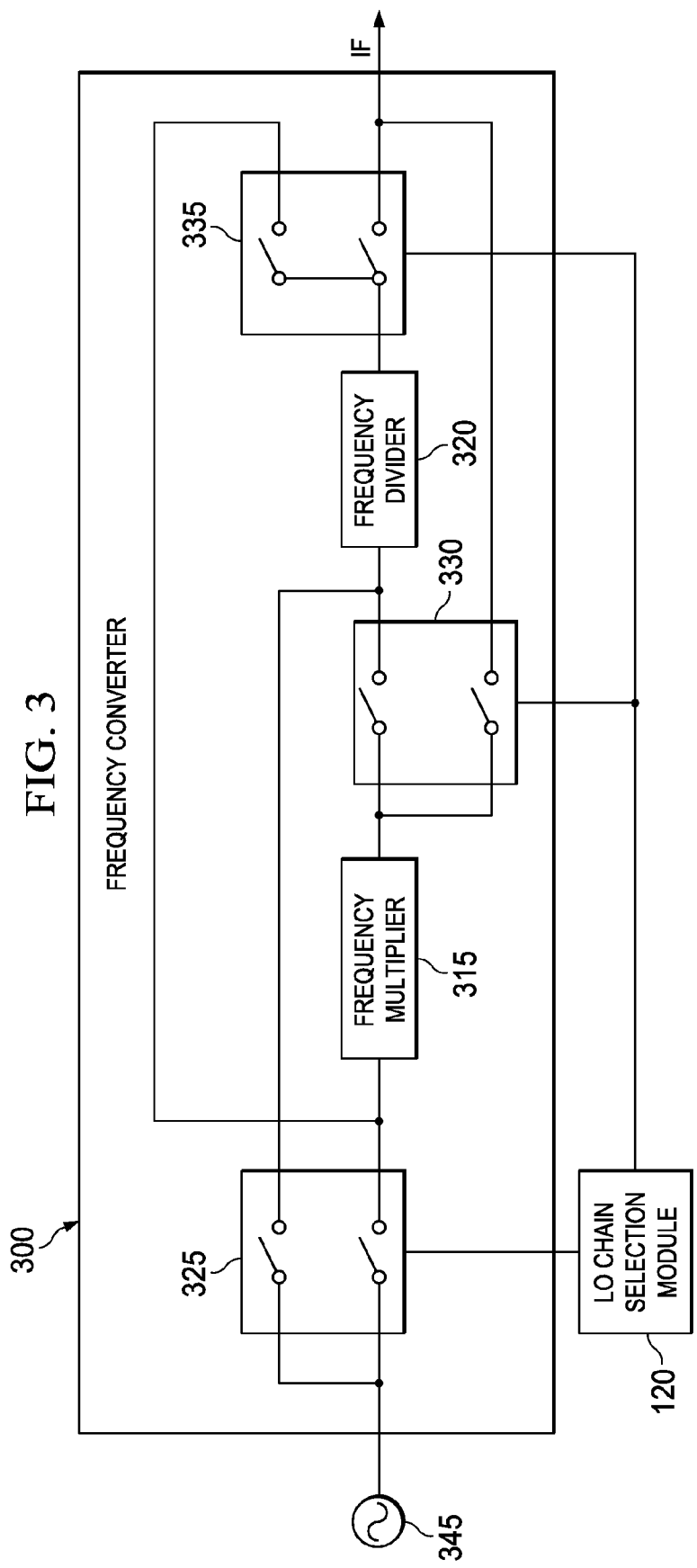
FIGS. 3 and 4 are block diagrams of frequency converters according to various example embodiments.

FIG. 3 is a block diagram of a frequency converter 300 according to various example embodiments. The frequency converter 300 may include a frequency multiplier 315, a frequency divider 320, or both. Although the example embodiment of FIG. 3 shows a single frequency multiplier 315 and a single frequency divider 320, it is noted that some embodiments may include a frequency multiplier without a frequency divider or vice versa. Some embodiments may include more than one frequency multiplier and/or frequency divider. The frequency multiplier 315 and frequency divider 320 multiply and/or divide the base oscillator frequency by appropriate factors.

Some embodiments may also include a first switch bank 325, a second switch bank 330, and/or a third switch bank 335. The switch banks 325, 330, 335 are controlled by the LO chain selection module 120. The LO chain selection module 120 may utilize the switch banks 325, 330, 335 to select various combinations of frequency division and/or frequency multiplication. A selected combination of frequency division and/or frequency multiplication acts upon the base oscillator signal produced by the selected base oscillator 345. The combination is chosen such that spurs associated with the resulting IF output signal lie outside of active spectral bands, as described above.

In an example embodiment, the first switch bank 325 may switch the base oscillator signal to the input of the frequency multiplier 315 or to the input of the frequency divider 320. The second switch bank 330 may switch the output of the frequency multiplier 315 to the input of the frequency divider 320 or to the IF output of the frequency converter 300. The third switch bank 335 may switch the output of the frequency divider 320 to the input of the frequency multiplier 315 to perform frequency multiplication after performing frequency division, if appropriate.

Figure 4:
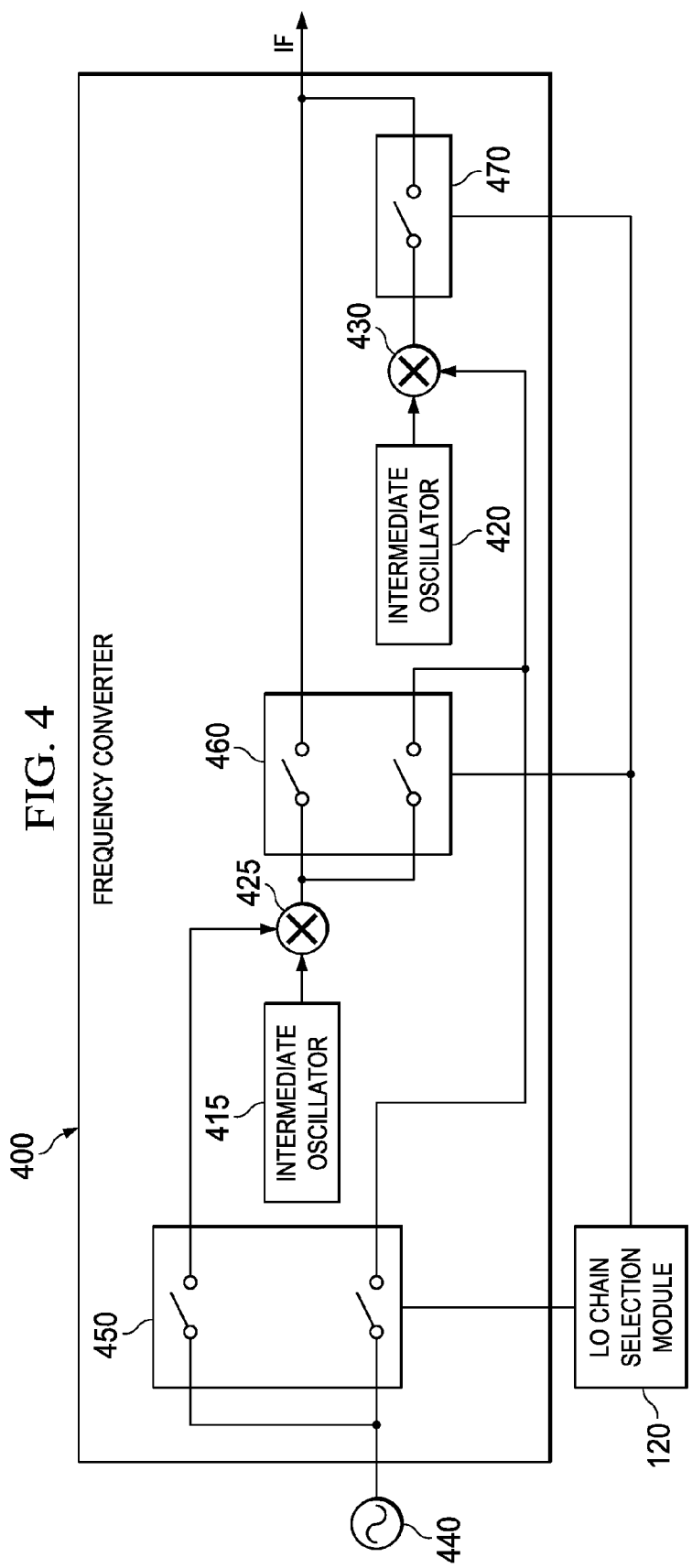

FIG. 4 is a block diagram of a frequency converter 400 according to various example embodiments. The frequency converter 400 may include one or more intermediate oscillators (e.g., the intermediate oscillators 415 and 420). The frequency converter 400 may also include one or more mixers (e.g., the mixers 425 and 430), each mixer associated with an output of one of the intermediate oscillators 415, 420. The mixer 425 combines the base oscillator signal from the selected base oscillator 440 with an intermediate oscillator signal generated by the intermediate oscillator 415 to produce a difference signal at its output. Some embodiments may include additional intermediate oscillator/mixer pairs (e.g. the intermediate oscillator 420 and the mixer 430) to provide additional stages of frequency conversion.

Some embodiments may also include a first switch bank 450, a second switch bank 460, and/or a third switch bank 470. The switch banks 450, 460, 470 are controlled by the LO chain selection module 120. The LO chain selection module 120 may utilize the switch banks 450, 460, 470 to select various combinations of signal generation and mixing. A combination is chosen such that the resulting IF output signal is substantially free of spurs in active spectral bands, as described above.

The first switch bank 450 may switch the base oscillator signal to the input of the mixer 425, the input of the mixer 430, or both. The second switch bank 460 may switch a difference signal output from the mixer 425 to the IF output of the frequency converter 400 or to the input of the second mixer 430. The third switch bank 470 may switch a difference signal output of the second mixer 430 to the IF output of the frequency converter 400 if the intermediate oscillator 420 and the second mixer 430 are active in the circuit. Additional switches may be implemented in like manner as required for embodiments employing additional intermediate conversion stages.

The spectrum chart 100; the communication bands 110; the frequency ranges 115, 120A, 120B, 125A, 125B, 130, 135; the spurious harmonic groups 140A, 140B, 140C; the LO apparatus 200; the LO chains 105A, 105B ... 105(N); the base oscillators 110A, 110B ... 110(N), 345, 440; the frequency converters 115A, 115B ... 115(N), 300, 400; the LO chain selection module 120; the active radio selection module 122; the switch banks 125A, 125B ... 125(N), 325, 330, 335, 450, 460, 470; the outputs 130A, 135A; the mixers 140, 425, 430; the bandpass filter 145; the divide by two module 150; the frequency multiplier 315; the frequency divider 320; the intermediate oscillators 415, 420; and the PLL 155 may all be characterized as "modules" herein.

The modules may include hardware circuitry, optical components, single or multi-processor circuits, memory circuits, and/or computer instructions encoded in a computer-readable medium and capable of being executed by a processor (excluding non-functional descriptive matter), firmware, and combinations thereof, as desired by the architects of the selectable LO chain apparatus 200 and the frequency converters 300, 400, and as appropriate for particular implementations of various embodiments.

The apparatus and systems described herein may be useful in applications other than placing spurs created by a receiver LO chain outside of radio bands being utilized by other active, substantially collocated radio receivers. Examples of the selectable LO chain apparatus 200 and the frequency converters 300, 400 described herein are intended to provide a general understanding of the structures of various embodiments. They are not intended to serve as complete descriptions of all the elements and features of apparatus and systems that might make use of these structures.

The various embodiments may be incorporated into electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may also include one or more methods.

Figure 5:
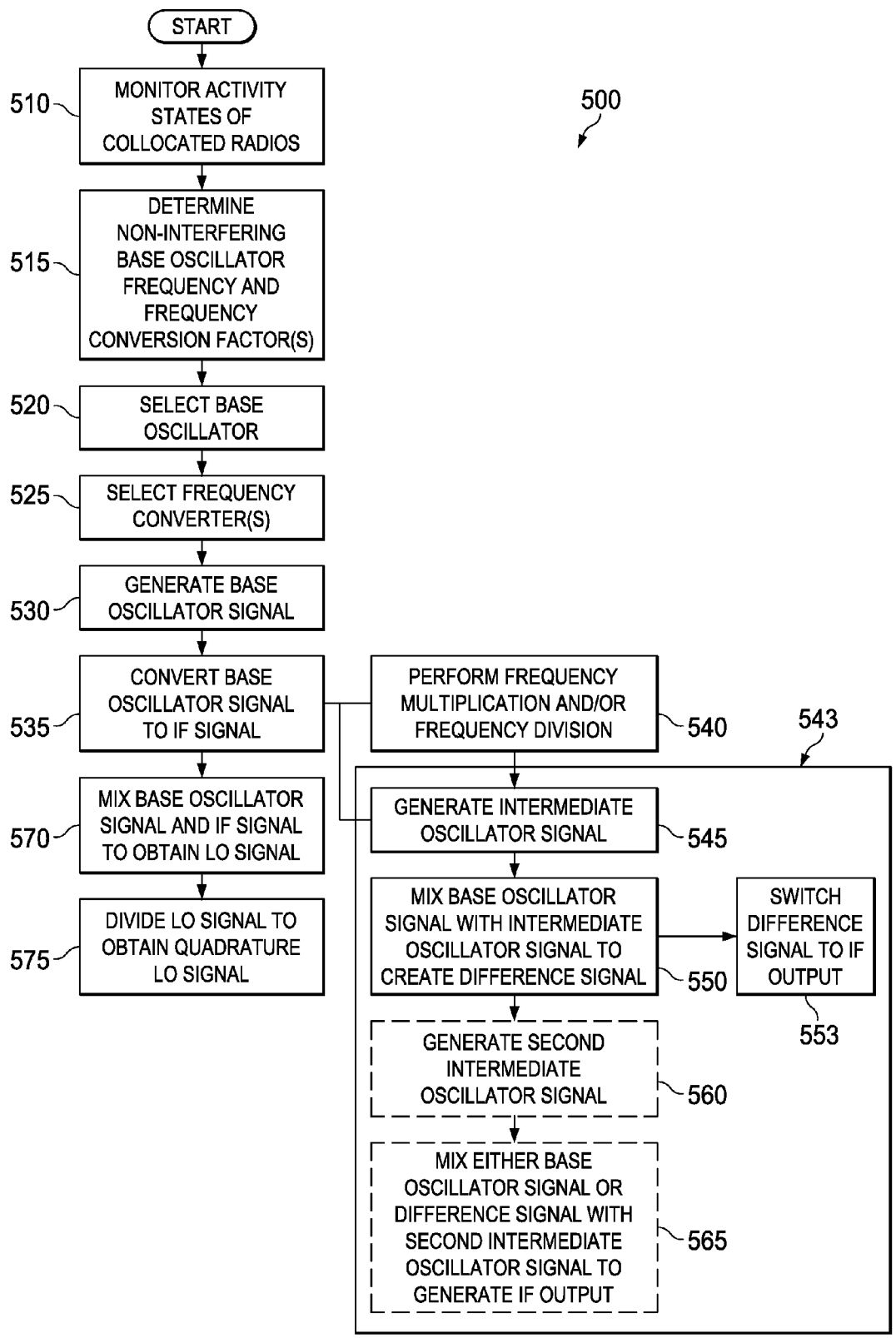
FIG. 5 is a flow diagram illustrating an example method.

FIG. 5 is a flow diagram illustrating an example method 500. The method 500 monitors the operational state of radio receivers in a multi-receiver apparatus such as a PMC device and customizes receiver LO chain frequency conversion accordingly. Frequency conversion elements are selected such as to place spurs created by the LO chain outside of radio bands being utilized by other active, substantially collocated radio receivers.

The method 500 commences at block 510 with monitoring the activity states of substantially collocated radio receivers. Radio services may be switched on and off by a user of a PMC device and/or by processes executing within the PMC device. Activation of a radio service leaves frequency bands associated with that radio service vulnerable to interference caused by frequency conversion within LO chains of other active radio receivers.

The method 500 may continue at block 515 with determining a base oscillator frequency and one or more frequency conversion factor(s) associated with an appropriate selectable LO chain portion of an active radio receiver. The oscillator frequency and frequency conversion factors are chosen such that spurs created by the resulting LO chain lie outside of communication bands associated with other active radio receivers substantially collocated with the LO chain.

The method 500 includes selecting a base oscillator corresponding to the base oscillator frequency, at block 520, and with selecting one or more frequency converter(s) corresponding to the frequency conversion factor(s), at block 525. These components may be selected from a switched set of base oscillator/frequency converter pairs included in a selectable LO chain apparatus.

The method 500 also includes generating a base oscillator signal at the base oscillator frequency, at block 530. The method 500 further includes converting the base oscillator signal to an IF signal, at block 535. The selected frequency converter (e.g., the frequency converter 115A of FIG. 2) performs the conversion according to the frequency conversion factor(s).

The method 500 may utilize one or more sub-methods to perform base oscillator signal to IF signal conversion. These sub-methods may utilize structures such as those illustrated in FIGS. 3 and 4. Using one such sub-method, the method 500 may continue at block 540 with performing one or more frequency multiplier operations and/or frequency divider operations to achieve the frequency conversion factor.

The method 500 may utilize a second sub-method 543 to generate the IF signal. The second sub-method 543 includes generating an intermediate oscillator signal at an intermediate oscillator (e.g. the intermediate oscillator 415 of FIG. 4), at block 545. The second sub-method 543 also includes mixing the base oscillator signal and the intermediate oscillator signal to generate a difference signal, at block 550. The second sub-method may proceed at block 553 with switching the difference signal to the output of a frequency converter (e.g., the frequency converter 400 of FIG. 4).

The second sub-method 543 may optionally proceed at block 560 with generating a second intermediate oscillator signal at a second intermediate oscillator (e.g., the second intermediate oscillator 420 of FIG. 4). The second sub-method 543 may also include mixing either the base oscillator signal or the difference signal with the second intermediate oscillator signal to generate the IF signal output, at block 565.

The method 500 may include mixing the base oscillator signal with the IF signal to generate an LO signal, at block 570. The method 500 may conclude at block 575 with dividing the LO signal to generate a quadrature LO signal.

It is noted that the activities described herein may be executed in an order other than the order described. The various activities described with respect to the methods identified herein may also be executed in repetitive, serial, and/or parallel fashion. In some embodiments, for example, the method 500 may repeat in whole or in part as various radio services associated with a PMC device are switched on and off during operation.

Apparatus and methods described herein operate to monitor the operational state of radio receivers in a multi-receiver apparatus such as a PMC device and to customize receiver LO chain frequency conversion accordingly. Frequency conversion elements are selected such as to place spurs created by the LO chain outside of radio bands being utilized by other active, substantially collocated radio receivers. Filtering/shielding device costs and circuit board space may be conserved as a result.

Although the inventive concept may include embodiments described in the example context of an Institute of Electrical and Electronic Engineers (IEEE) standard 802.xx implementation (e.g., 802.11, 802.11a, 802.11b, 802.11e, 802.11g, 802.16, 802.16e™, etc.), the claims are not so limited. Additional information regarding the IEEE 802.11 standard may be found in ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications (published 1999; reaffirmed June 2003). Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11e standard may be found in IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements (published 2005). Additional information regarding the IEEE 802.11g protocol standard may be found in IEEE Std 802.11g™, IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

Embodiments of the present invention may be implemented as part of a wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

By way of illustration and not of limitation, the accompanying figures show specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A selectable local oscillator (LO) chain apparatus, comprising:
   a switched plurality of base oscillators to generate a base oscillator signal;
   a plurality of frequency converters, each frequency converter communicatively coupled to a corresponding base oscillator to receive and convert the base oscillator signal to an intermediate frequency (IF) signal; and
   an LO chain selection module communicatively coupled to the plurality of base oscillators to choose a base oscillator such that spurious harmonics created by frequency conversion of the base oscillator signal within the LO chain apparatus lie outside of communication bands associated with active radio receivers substantially collocated with the LO chain apparatus.

2. The selectable LO chain apparatus of claim 1, further comprising:
   a plurality of switch banks, one switch bank communicatively coupled to each frequency converter to select at least one of an active base oscillator output or a corresponding frequency converter output, the switch bank controlled by the LO chain selection module.

3. The selectable LO chain apparatus of claim 2, further comprising:
   a radio-frequency (RF) mixer communicatively coupled to at least one of the switch banks to derive an LO signal by mixing a selected base oscillator signal and a selected IF signal.

4. The selectable LO chain apparatus of claim 2, further comprising:
   a bandpass filter communicatively coupled to at least one of the plurality of switch banks to filter harmonics from the LO signal.

5. The selectable LO chain apparatus of claim 1, further comprising:
   an active radio selection module communicatively coupled to the LO chain selection module to indicate to the LO chain selection module 120 which radio receivers substantially collocated with the selectable LO chain apparatus are active.

6. The selectable LO chain apparatus of claim 1, at least one of the frequency converters further comprising:

at least one of a frequency multiplier or a frequency divider.

7. The selectable LO chain apparatus of claim 6, the at least one frequency converter further comprising:

a first switch bank to switch the base oscillator signal to at least one of an input of the frequency multiplier or an input of the frequency divider;

a second switch bank to switch an output of the frequency multiplier to at least one of an input of the frequency divider or an output of the frequency converter; and a third switch bank to switch an output of the frequency divider to an input of the frequency multiplier.

8. The selectable LO chain apparatus of claim 1, at least one of the frequency converters further comprising:

an intermediate oscillator to produce an intermediate oscillator signal; and a mixer to generate a difference signal by mixing the base oscillator signal with the intermediate oscillator signal.

9. The selectable LO chain apparatus of claim 8, the at least one frequency converter further comprising:

a second intermediate oscillator to produce a second intermediate oscillator signal; and a second mixer to generate a second difference signal by mixing the difference signal with the second intermediate oscillator signal.

10. The selectable LO chain apparatus of claim 9, the at least one frequency converter further comprising:

a first switch bank to switch the base oscillator signal to at least one of an input of the mixer or an input of the second mixer;

a second switch bank to switch the difference signal to at least one of the input of the second mixer or an output of the frequency converter as the IF signal; and a third switch bank to switch the second difference signal to the output of the frequency converter as the IF signal if the difference signal is not switched to the output of the frequency converter.

11. A selectable local oscillator (LO) chain apparatus, comprising:

a switched plurality of base oscillators to generate a base oscillator signal;

a plurality of frequency converters, each communicatively coupled to a corresponding base oscillator to receive and convert the base oscillator signal to an intermediate frequency (IF) signal;

a LO chain selection module communicatively coupled to the plurality of base oscillators to choose a base oscillator such that spurious harmonics created by frequency conversion of the base oscillator signal within the LO chain apparatus lie outside of communication bands associated with active radio receivers substantially collocated with the LO chain apparatus;

a plurality of switch banks, one switch bank communicatively coupled to each frequency converter to select at least one of an active base oscillator output or a corresponding frequency converter output, the switch bank controlled by the LO chain selection module;

a radio-frequency (RF) mixer communicatively coupled to at least one of the switch banks to derive an LO signal by mixing a selected base oscillator signal and a selected IF signal; and an active radio selection module communicatively coupled to the LO chain selection module to indicate to the LO chain selection module which radio receivers substantially collocated with the selectable LO chain apparatus are active.

12. A method of reducing interference from a local oscillator (LO) chain in a device incorporating a plurality of co-located radio receivers, comprising:

determining a base oscillator frequency and a frequency conversion factor such that spurious harmonics created within the LO chain lie outside of communication bands associated with active radio receivers substantially collocated with circuitry associated with the LO chain; and selecting a base oscillator corresponding to the base oscillator frequency and an associated frequency converter corresponding to the frequency conversion factor from a switched plurality of base oscillator/frequency converter pairs.

13. The method of claim 12, further comprising:

at the selected base oscillator, generating a base oscillator signal at the base oscillator frequency; and at the selected frequency converter, converting the base oscillator signal to an intermediate frequency (IF) signal according to the frequency conversion factor.

14. The method of claim 13, further comprising:

mixing the base oscillator signal and the IF signal to generate an LO signal.

15. The method of claim 14, further comprising:

dividing the LO signal to generate a quadrature LO signal.

16. The method of claim 12, further comprising:

performing at least one of a frequency multiplier operation or a frequency divider operation according to the frequency conversion factor to generate an intermediate frequency (IF) signal.

17. The method of claim 12, further comprising:

generating an intermediate oscillator signal at an intermediate oscillator; and mixing the intermediate oscillator signal with a base oscillator signal associated with the base oscillator to generate a difference signal.

18. The method of claim 17, further comprising:

generating a second intermediate oscillator signal at a second intermediate oscillator; and mixing the second intermediate oscillator signal and the difference signal to generate a second difference signal.

19. The method of claim 18, further comprising:

switching at least one of the difference signal or the second difference signal to an output of the selected frequency converter as an IF signal.

20. The method of claim 13, further comprising:

monitoring states of activity of radio receivers substantially collocated with the LO chain.

\* \* \* \* \*